(12) United States Patent
Aboukhaled et al.

(10) Patent No.: US 11,465,469 B2
(45) Date of Patent: Oct. 11, 2022

(54) RECREATIONAL VEHICLE AND TRAILER WINDOW TREATMENT ADJUSTMENT SYSTEM

(71) Applicant: State Wide Aluminum, Inc., Elkhart, IN (US)

(72) Inventors: Georges Aboukhaled, Granger, IN (US); Jason Barhydt, Union, MI (US); Jack Shanholt, II, Bristol, IN (US)

(73) Assignee: State Wide Aluminum, Inc., Elkhart, IN (US)

( * ) Notice: Subject to any disclaimer, the term of this patent is extended or adjusted under 35 U.S.C. 154(b) by 676 days.

(21) Appl. No.: 16/538,083

(22) Filed: Aug. 12, 2019

(65) Prior Publication Data

US 2019/0359035 A1 Nov. 28, 2019

Related U.S. Application Data

(63) Continuation of application No. 15/592,544, filed on May 11, 2017, now Pat. No. 10,377,211.

(60) Provisional application No. 62/335,098, filed on May 12, 2016.

(51) Int. Cl.
*B60J 1/14* (2006.01)
*B60J 1/20* (2006.01)
*E06B 9/264* (2006.01)

(52) U.S. Cl.
CPC .............. *B60J 1/14* (2013.01); *B60J 1/2091* (2013.01); *E06B 2009/2643* (2013.01)

(58) Field of Classification Search
CPC . B60J 1/14; B60J 1/2091; B60J 1/2016; B60J 1/203; B60J 1/2036; B60J 1/2044; B60J 1/2052; E06B 9/264; E06B 2009/2643; E06B 2009/2646

USPC ................... 296/97.4, 97.8, 190.1
See application file for complete search history.

(56) References Cited

U.S. PATENT DOCUMENTS

| | | | | |
|---|---|---|---|---|
| 2,557,978 A | * | 6/1951 | Krumm ................ | E06B 9/264 160/172 R |
| 3,153,819 A | * | 10/1964 | Bond ................ | B65D 19/44 160/DIG. 16 |
| 4,480,674 A | * | 11/1984 | Anderson ........... | E06B 9/264 160/107 |
| 4,687,040 A | * | 8/1987 | Ball ................ | E06B 9/264 160/176.1 R |
| 4,768,576 A | * | 9/1988 | Anderson ........... | E06B 9/264 160/107 |
| 10,377,211 B2 | * | 8/2019 | Aboukhaled ........ | B60J 1/2091 |

(Continued)

FOREIGN PATENT DOCUMENTS

CN 111350452 A * 6/2020
EP 0082723 A1 * 6/1983

*Primary Examiner* — D Glenn Dayoan
*Assistant Examiner* — Wenwei Zhuo
(74) *Attorney, Agent, or Firm* — Barnes & Thornburg LLP

(57) ABSTRACT

A window treatment adjustment assembly is provided that includes a slider having a base movable along a portion of the frame. A handle extends from the base. A pocket is formed in the screen and includes: a pocket frame attached to the screen to form an opening through the screen; a shroud member attached to at least a portion of the pocket frame. The handle of the slider extends through the opening of the pocket and past the shroud member. The base of the slider is in communication with a mechanism that moves the window treatment.

19 Claims, 12 Drawing Sheets

(56) References Cited

U.S. PATENT DOCUMENTS

2003/0075285 A1* 4/2003 Anderson ............... E06B 9/264
                                                                               160/90
2014/0209256 A1* 7/2014 Zhang .................... E06B 9/264
                                                                               160/107

* cited by examiner

RECREATIONAL VEHICLE AND TRAILER WINDOW TREATMENT ADJUSTMENT SYSTEM

RELATED APPLICATIONS

The present application is a continuation of application Ser. No. 15/592,544 filed on May 11, 2017 entitled Recreational Vehicle and Trailer Window Treatment Adjustment System and claims priority to U.S. Provisional Patent Application, Ser. No. 62/335,098, filed on May 12, 2016. The subject matter disclosed in that provisional application is hereby expressly incorporated into the present application in its entirety.

TECHNICAL FIELD AND SUMMARY

The present disclosure is directed to a recreational vehicle and/or trailer having a window with an adjustable window treatment thereon, wherein the window is movable between open and closed positions and has a screen covering an interior-side window opening. More particularly, this disclosure is directed to an actuation assembly that permits adjustment of the window treatment without removing the screen from the window opening.

Recreational vehicles such as campers, motor homes, fifth-wheels, and the like, as well as trailers such as horse and utility trailers, include windows that are movable between their open and closed positions relative to their corresponding window openings. Such windows may be thermal-type composed of two panes of glass with an air space located there between. This space between the panes of glass is often occupied by a window treatment such as venetian blinds, vertical blinds, curtains, shades, films or the like, that may be raised, lowered, or otherwise moved while remaining between the panes of glass. In this arrangement the window treatment will move with the window while opened or closed. Also because of this arrangement, a screen is necessary to cover the window opening to prevent insects and/or debris from entering the recreational vehicle from the outside while the window is open.

In order to move the blind between its open and closed positions while sandwiched between panes of glass, a slider-type mechanism may be located in the frame adjacent the window. In certain instances this extension and retraction system is sealed in the window frame. In order to operate the system, a slider device employing magnets or the like is located exterior of the frame and is used to magnetically engage and move the extension and retraction system on the interior of the frame.

A problem however, is that when such slider devices are located exterior of the window frame, they may be covered by the screen. Typically, the screen is the innermost window cover on a recreational vehicle. Because of this arrangement, it is necessary to remove the screen in order to access the slider device. In conventional practice, after the screen is removed the slider device is moved to make the desired adjustment of the window treatment. The screen is then reattached. This is believed to be a relatively inefficient way of adjusting the window treatments.

Accordingly, an illustrative embodiment of the present disclosure is directed to vehicle window assembly which includes a frame that holds two spaced apart window panes and a movable window treatment located between the two spaced apart window panes; a mechanism that moves the window treatment located adjacent the movable window treatment; a screen that is spaced apart from and covers at least one of the two spaced apart window panes; wherein the frame is movable between an open position away from the screen and a closed position proximal to the screen; and an improvement to the vehicle window assembly that includes a window treatment adjustment assembly located on the frame to operate the window treatment. The window treatment adjustment assembly comprises: a longitudinally-extending guide rail located on the frame; a slider that includes: a base movable along a portion of the frame; a handle that extends from the base and the frame; a coupler that engages the longitudinally-extending guide rail so the base is movable with respect to the longitudinally-extending guide rail; wherein the longitudinally-extending guide rail defines a path of travel of the slider and the slider is movable along the path of travel of the longitudinally-extending guide rail; a pocket formed in the screen over the path of travel of the longitudinally-extending guide rail; wherein the pocket includes: a pocket frame attached to the screen to form an opening through the screen; a shroud member attached to at least a portion of the pocket frame; wherein at least a portion of the shroud member is resilient to selectively cover the opening within the pocket frame; wherein the handle of the slider extends through the opening of the pocket and past the shroud member when the frame is in the closed position; wherein the handle is movable in the pocket and moves the base of the slider; wherein the base of the slider is in communication with the mechanism that moves the window treatment so that movement of the base moves the window treatment between the two spaced apart window panes; wherein as the handle moves in the pocket a portion of the opening of the pocket that is not occupied by the handle is covered by the shroud member due to the resiliency of the shroud member; wherein the handle of the slider does not extend through the opening of the pocket when the frame is in the open position; and wherein the shroud member covers the opening of the pocket when the handle of the slider is not extended through the opening of the pocket when the frame is in the open position.

In the above and other illustrative embodiments, the window treatment adjustment assembly may further comprise: the base of the slide including at least one magnet that is in magnetic communication with the mechanism that moves the window treatment; the longitudinally-extending guide rail being linear; the longitudinally-extending guide rail extending along a line that is not linear; the handle being movable with respect to the base; the handle being grippable when extended through the pocket without moving the screen when the frame is in the closed position; the frame member including a first side and a second side with the opening located in between, wherein the shroud member including a first shroud portion extending inwardly from the first side of the frame member and a second shroud portion extending inwardly from the second side of the frame member; the first second shroud members being selected from a group consisting of whiskers, woolpile, and rubber strips; the base may also include at least one roller that engages the frame to ease movement of the slider along the frame; and the handle rotatable with respect to the base to move the mechanism that moves the window treatment.

Another illustrative embodiment of the present disclosure is also directed to a vehicle window assembly which includes a frame that holds two spaced apart window panes and a movable window treatment located between the two spaced apart window panes; a mechanism that moves the window treatment located adjacent the movable window treatment; a screen that is spaced apart from and covers at least one of the two spaced apart window panes; wherein the frame is movable between an open position away from the screen and a closed position proximal to the screen; and an improvement to the vehicle window assembly that includes a window treatment adjustment assembly located on the frame to operate the window treatment. The window treatment adjustment assembly comprises: a slider that includes: a base movable along a portion of the frame; a handle that extends from the base and the frame; and a pocket formed in the screen; wherein the pocket includes: a pocket frame attached to the screen to form an opening through the screen; a shroud member attached to at least a portion of the pocket frame; wherein the handle of the slider extends through the opening of the pocket and past the shroud member a portion of which is displaced; wherein the handle moves the base of the slider; and wherein the base of the slider is in communication with the mechanism that moves the window treatment.

In the above and other illustrative embodiments, the window treatment adjustment assembly may further comprise: the handle being extendable through the pocket when the frame is located in the open position away from the screen and when in the frame is located in the closed position proximal to the screen; the pocket having a shape selected from the group consisting of rectangular, square, and round; the handle being rotatable to operates the mechanism that moves the window treatment; a longitudinally-extending guide rail located on the frame; a coupler that engages the longitudinally-extending guide rail so the base is movable with respect to the longitudinally-extending guide rail; the longitudinally-extending guide rail defining a path of travel of the slider and the slider being movable along the path of travel of the longitudinally-extending guide rail; the pocket formed in the screen being located over the path of travel of the longitudinally-extending guide rail; at least a portion of the shroud member being resilient to the extent that the shroud member is moveable back to its original position at a location not occupied by the handle; movement of the base moves the window treatment between the two spaced apart window panes; and the handle of the slider does not extend through the opening of the pocket when the frame is in the open position; and wherein the shroud member covers the opening of the pocket when the handle of the slider is not extended through the opening of the pocket when the frame is in the open position.

Additional features and advantages of the recreational vehicle window treatment adjustment system will become apparent to those skilled in the art upon consideration of the following detailed descriptions exemplifying the best mode of carrying out the recreational vehicle window treatment adjustment system as presently perceived.

BRIEF DESCRIPTION OF THE DRAWINGS

The concepts described in the present disclosure are illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference labels may be repeated among the figures to indicate corresponding or analogous elements.

Figure 1:
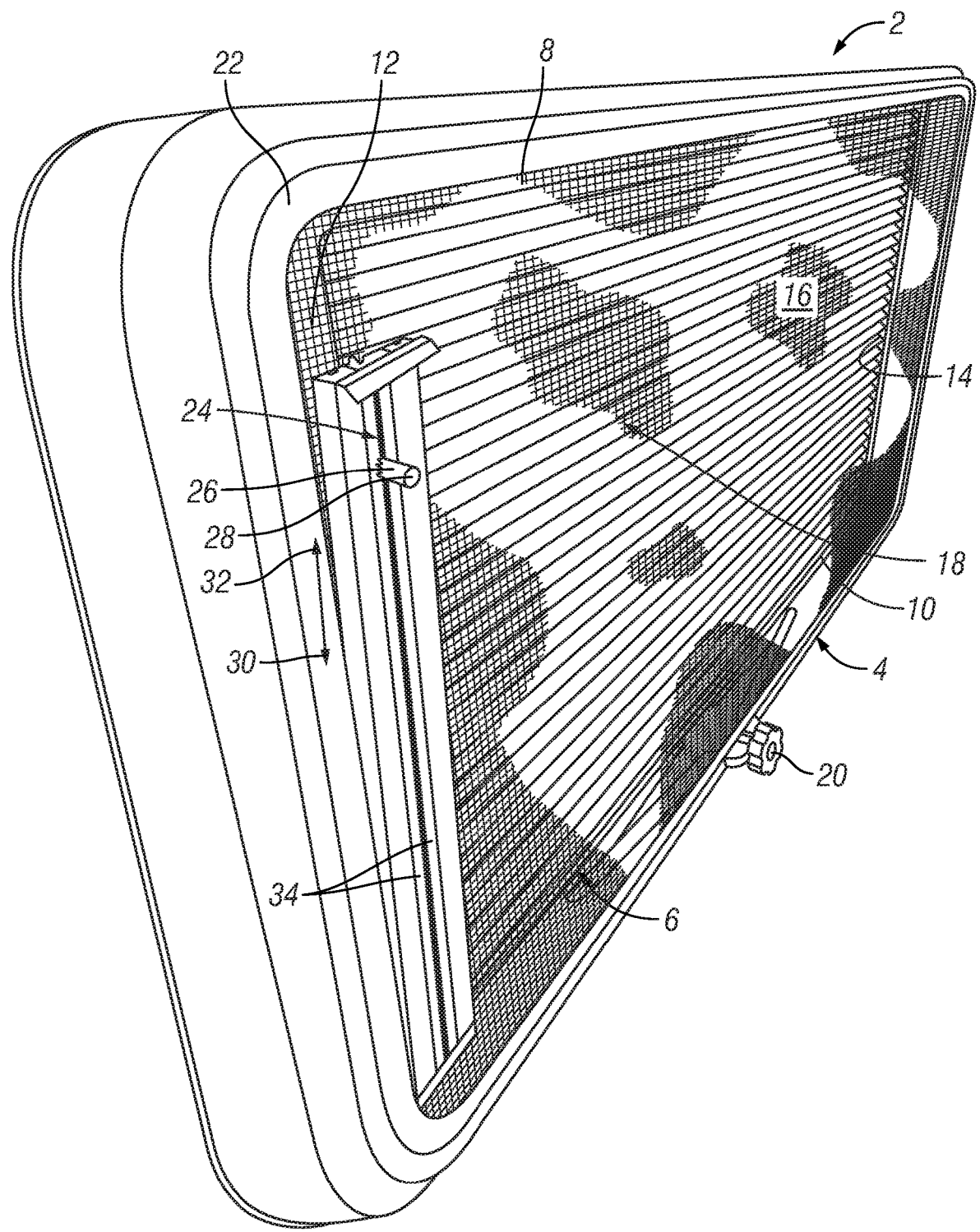
FIG. 1 is a perspective view of a recreational vehicle window assembly.

The exemplification set out herein illustrates embodiments of the recreational vehicle window assembly, and such exemplification is not to be construed as limiting the scope of the recreational vehicle window assembly in any manner.

DISCLOSURE OF THE ILLUSTRATIVE EMBODIMENT

While the concepts of the present disclosure are susceptible to various modifications and alternative forms, specific exemplary embodiments thereof have been shown by way of example in the drawings and will herein be described in detail. It should be understood, however, that there is no intent to limit the concepts of the present disclosure to the particular forms disclosed, but to the contrary, the intention is to cover all modifications, equivalents, and alternatives falling within the spirit and scope of the present disclosure.

An embodiment of the present disclosure provides a mechanism for moving the slider device thereby adjusting the window treatment without having to remove the screen. In an illustrative embodiment, a pocket such as a slot may be disposed through the screen coincident with the path of travel of the slider device. An extension bar, handle, or other like structure may extend outwardly from the slider device and through the slot on the screen. In this configuration, an operator may grasp the handle and slide it along a path of travel within the slot adjusting the window treatment as desired. The effect of this is the window treatments are adjustable without the operator having to first remove the screen.

It is appreciated that along each side of the pocket or slot may be inwardly depending structures including, but not limited to, whiskers, woolpile, or rubber strips. They extend along the longitudinal extent of the slot and direct inwardly to obscure the slot opening except at the location of the extension bar. The structures do not restrict movement of the bar along the path of travel while adjusting the window treatments.

It is further appreciated that in alternate embodiments, the pocket and/or extension bar may be configured differently to operate different types of window treatment adjustment mechanisms. For example, the pocket may be circular to accommodate a rotational operating extension bar used to rotationally adjust the window treatment. The pocket may be oriented horizontal, diagonal, etc., to accommodate a variety of adjustment mechanisms. Because they operate pursuant the disclosures herein, these alternate embodiments are contemplated to be within the scope of this specification as well.

Referring now to the drawings, a perspective view of a recreational vehicle window assembly 2 is shown in FIG. 1. Window assembly 2 includes a sash 4 that frames the window and is configured to fit into a window opening made in the sidewall of a recreational vehicle. A window frame assembly 6 is fitted inside sash 4. Window frame assembly 6 includes top and bottom rails 8 and 10 connected to side stiles 12 and 14. These form the frame assembly 6 that receives window pane 16. Not depicted in this view but evident from the disclosure is that window frame assembly 6 holds two panes of glass spaced apart with a window treatment located in that space (see FIG. 6). Shown is window treatment 18 in the form of horizontal blinds located underneath window pane 16 making them not directly accessible.

Figure 9:
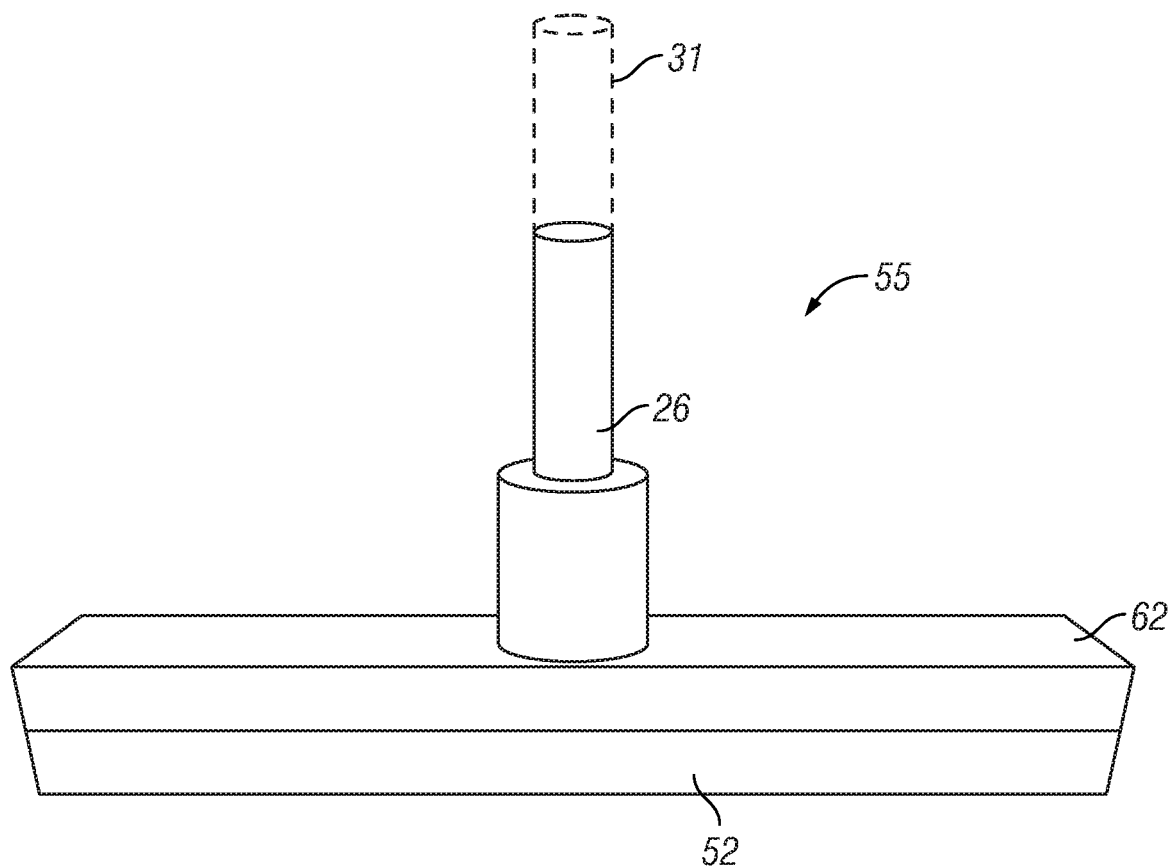
FIG. 9 is a side-elevational view of an embodiment of a slider base and handle.

It is appreciated that a variety of window treatments may be placed in the space between panes of window glass including curtains, shades, vertical blinds, etc. In many instances, these window treatments move to either conceal or expose the interior of the recreational vehicle. To accomplish this, a mechanism is often located inside window frame assembly 6 that moves window treatment 18. A device located exterior of window frame assembly 6 will allow an operator to move window treatment 18 sandwiched between window panes. An example of such a mechanism is a slider (see, e.g., FIGS. 4, 9, and 11) that includes, but is not limited to, one or more magnets that magnetically attach to the mechanism inside frame assembly 6 (see, e.g., FIG. 6). As the slider moves, the magnetic force causes the mechanism inside window frame assembly 6 to likewise move which moves window treatment 18.

Also shown in FIG. 1 is a window crank mechanism 20 configured to open and close window frame assembly 6 with respect to sash 4. Alternatively, mechanism 20 may be a push-out lever, electric mechanism, or other like mechanisms configured to move the window frame assembly 6. It is appreciated that when referring to mechanism 20, this may encompass any of these alternatives as well. Illustratively, hinges or other like structures may be attached to the top of window frame 6 while crank mechanism 20 is configured to extend and retract window frame 6 with respect to sash 4.

Because air circulation is important in a vehicle, a recreational vehicle being no exception, having the windows be able to open and close is a useful, often necessary feature. To that end, it has also become a common feature in many recreational vehicles. And because recreational vehicles often remain stationary for extended periods of time, and in warmer climates there is possibility for insects or even debris carried by wind to get through the open window if there is no screen. As shown in FIG. 1, a screen 22 is placed on sash 4 shrouding window frame assembly 6. A problem created by the screen is that it covers the entire window opening including window assembly frame 6. This makes access to the slider device or other window treatment actuation mechanism impossible without removing the screen.

An illustrative embodiment of this present disclosure addresses this issue by providing a pocket in the screen such as slot 24. The elongated shape of slot 24 accommodates the path of travel necessary by the slider or other mechanism that actually moves the window treatment. An extension rod 26 extends through slot 24 and connects to the slider (see, e.g., FIG. 6). An operator may grasp end portion 28 and slide it in directions 30 (or 32), which being connected to the slider will cause it to move thereby actuating window treatment 18. In this way, window treatment 18 is now adjustable without having to remove the screen. Additionally, and as shown, slot 24 is lined on each side by whisker strips 34 which help conceal a portion of slot 24 while still allowing extension rod 26 to extend there through.

Figure 2:
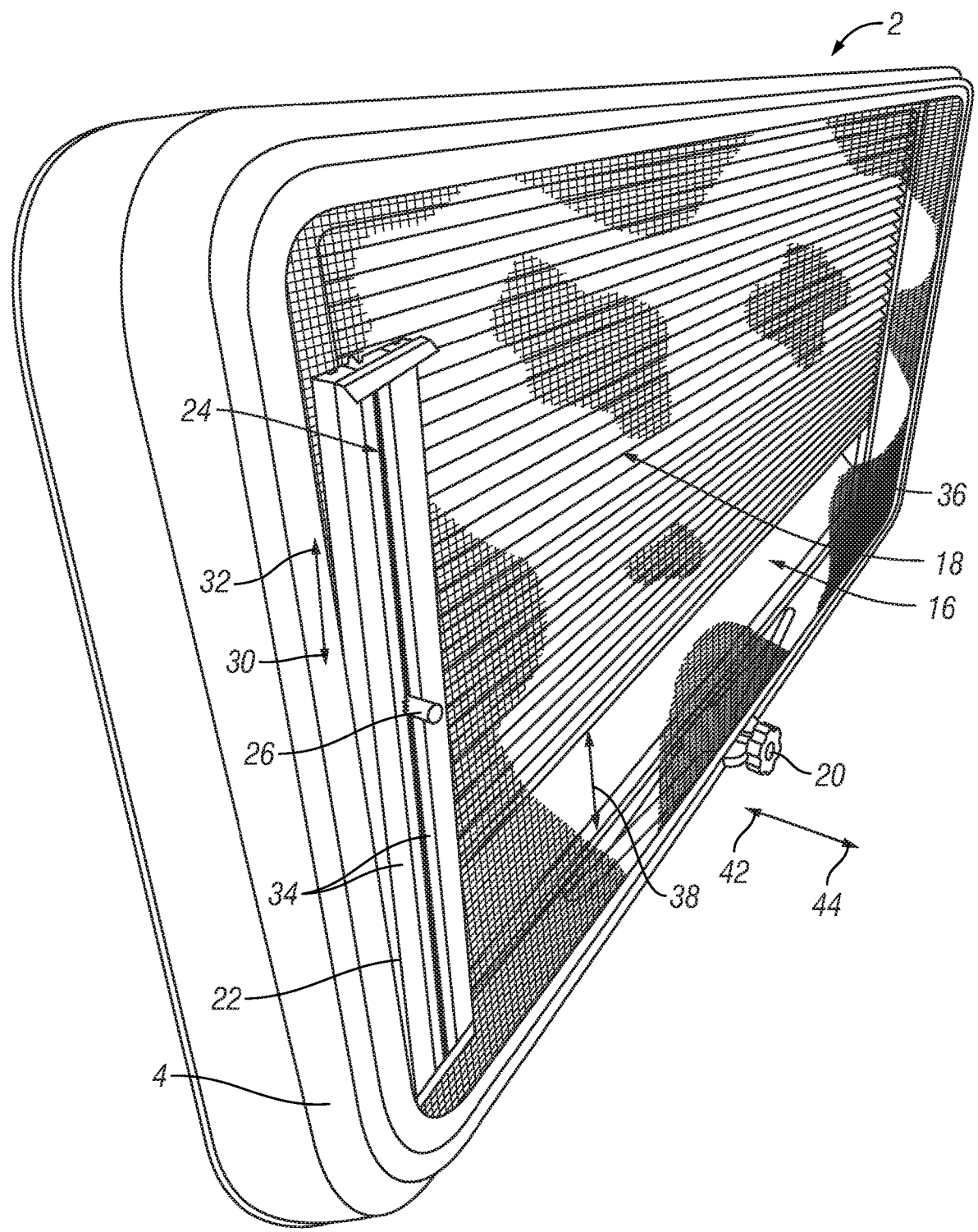
FIG. 2 is another perspective view of the recreational vehicle window assembly.

Another perspective view of recreational vehicle window assembly 2 is shown in FIG. 2. This view differs from that of FIG. 1 in that extension rod 26 has been slid downward in direction 30 which has moved window treatment 18 as shown. In this particular embodiment extension rod 26 may be connected to the slider (see, also, FIGS. 7-11) that operates the window treatment. Handle or extension rod 26 may operate to both rotate blades 36 of window treatment 18 as well as pull them up the distance 38 as shown. It is appreciated that in this embodiment, sliding extension rod 26 downward in direction 30 is what causes window treatment 18 to raise distance 38.

Additionally, such window assemblies have the ability to open and close using window crank mechanism 20 shown herein, or by another mechanism. As previously discussed, opening the window promotes air circulation in the vehicle but creates the necessity of having a screen in place as illustratively shown. In this case, window crank mechanism 20 may be rotated to act on window frame 6 or adjacent structure to open and close window frame assembly 6 with respect to sash 4. Because window frame assembly 6 may move in direction 42 to the illustrative "open" position, this will move extension rod 26 in direction 46 as well. In this embodiment, extension rod 26 is configured to be passed through slot 24 in direction 42 so as not to prevent window frame assembly 6 from moving to its open position. What this means is when window frame assembly 6 is located in its closed position with respect to sash 4, extension rod 26 extends through slot 24 and is available to move to adjust window treatment 18. When window frame assembly 6 is moved in direction 42 toward the open position with respect to sash 4, extension rod 26 may also move in direction 42 and effectively out of slot 24. In this embodiment, extension rod 26 may not be accessible by the operator inside of the recreational vehicle because extension rod 26 moved with window frame assembly 6. That said, extension rod 26 does not obstruct window frame assembly 6 from opening and closing with respect to sash 4. It is contemplated, however, that extension rod 26 or other like structure may be extended or be extendable so that it can still be accessible on the interior of the vehicle even if window frame assembly 6 is moved to its open position with respect to sash 4.

Figure 3:
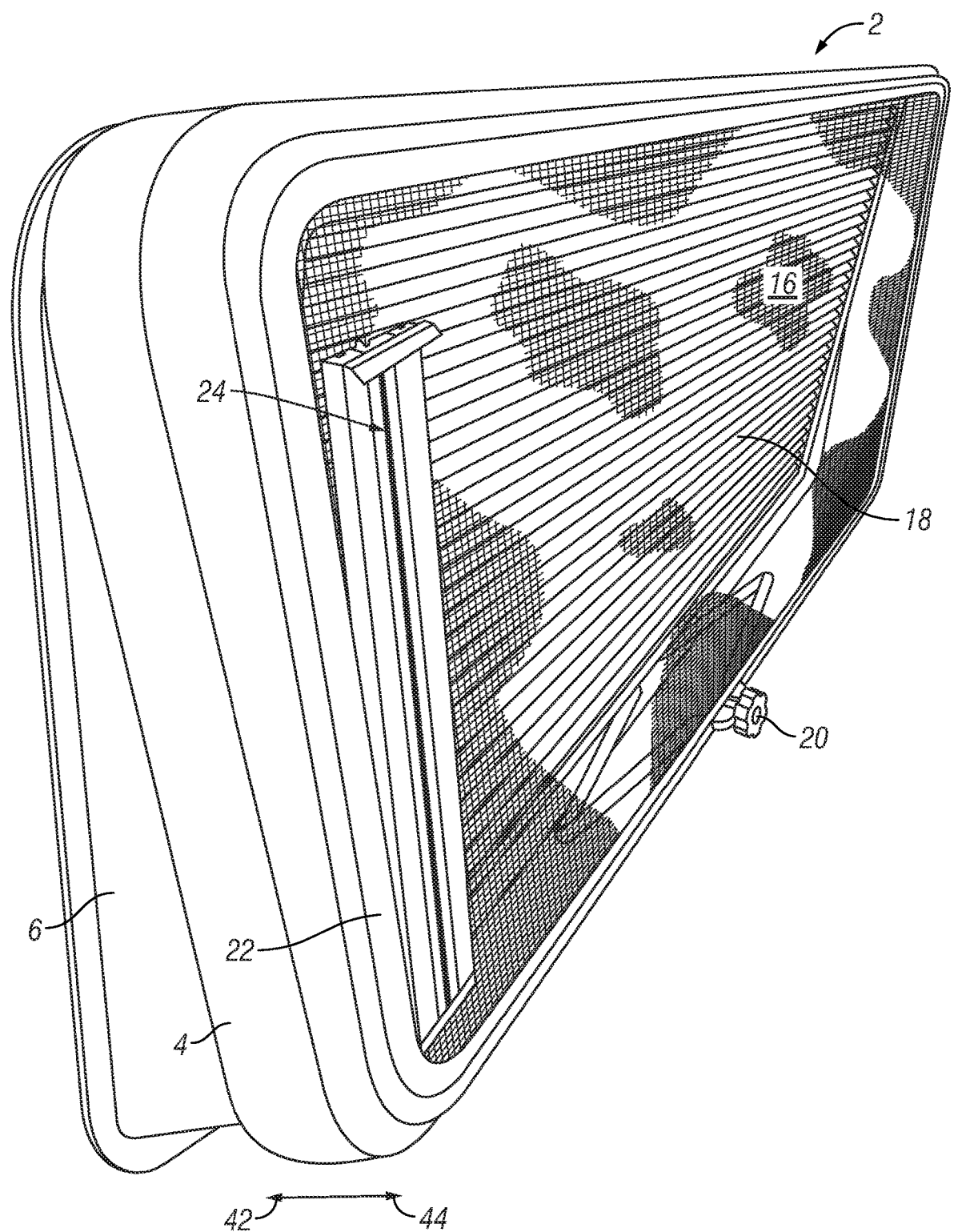
FIG. 3 is another perspective view of the recreational vehicle window assembly with the window portion located in an open position.

Another perspective view of recreational vehicle window assembly 2 with the window frame assembly 6 located in an open position is shown in FIG. 3. Like the prior views, this view shows sash 4, screen 22, window pane 16, window crank mechanism 20, and slot 24. Extension rod 26 is not shown located within slot 24. This is because window frame assembly 6 being open and extension rod 26 coupled thereto, extension rod 26 is pulled from slot 24. In other embodiments, such as that shown in FIG. 13, the extension rod or handle may be long enough to extend through slot 24 even if window frame assembly 6 is open.

Figure 4:
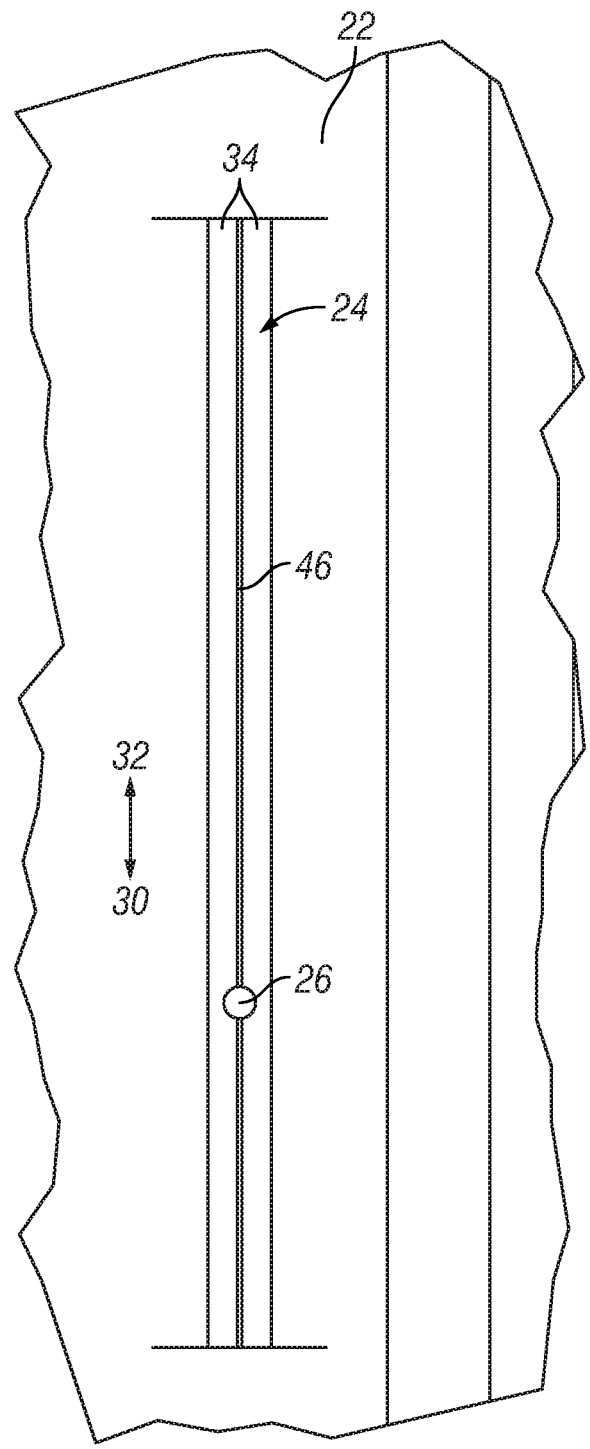
FIG. 4 is a front elevation detail view of the slot portion of the screen.

A front elevation detail view of slot 24 on screen 22 is shown in FIG. 4. This view depicts the pair of whisker strips 34 extending the longitudinal extent of slot 24 with a seam 46 disposed there between along which the extension rod 26 travels. It is appreciated that the shape and dimensions of the slot may be changed depending on the path of movement of the underlying window treatment adjustment mechanism. For example, if the adjustment mechanism is a slider but only needs to travel a relatively short distance, the length of slot 24 may likewise be reduced. Conversely, if the path of travel is longer, perpendicular, or disposed in multiple directions, the slot may be reoriented and dimensioned accordingly, or even segmented if necessary to follow the path of travel of the adjustment mechanism. In an alternate embodiment, the slot may be a square or round opening to accommodate a rotating window treatment adjustment mechanism. The objective of the slot is to be able to assist in adjusting the window treatment without having to remove the screen first.

Figure 5:
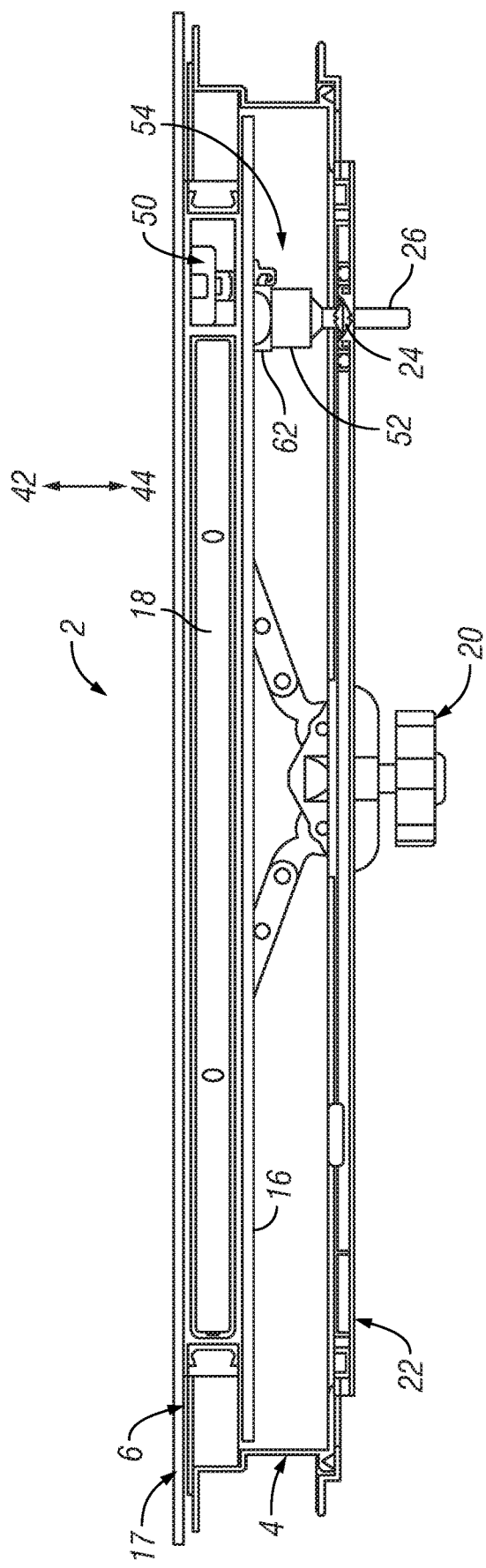
FIG. 5 is a top cross-sectional view of the recreational vehicle window assembly.

A cross-sectional top view is shown in FIG. 5. This view depicts sash 4, window frame assembly 6, and window panes 16 and 17 with window treatment 18 located there between. Window crank mechanism 20 is shown attached to window frame assembly 6 configured to move same in either directions 42 or 44. In this view an outer glass panel 17 is shown located opposite screen 22. The outer glass panel 17 illustratively trims out the window on the exterior side of the recreational vehicle. Also shown in this view is window treatment adjustment mechanism 50 which is the mechanism that actually adjusts window treatment 18. (See, also, FIG. 6). It is also appreciated in this view that extension rod 26 extends through slot 24 and out of screen 22. Illustratively, extension rod 26 may be either formed integral with or attached to base portions 52 and 62 that are part of slider mechanism 54. This view further demonstrates how extension rod 26 is accessible exterior of screen 22 yet able to engage and activate slider mechanism 54 that illustratively remains concealed behind screen 22.

Figure 6:
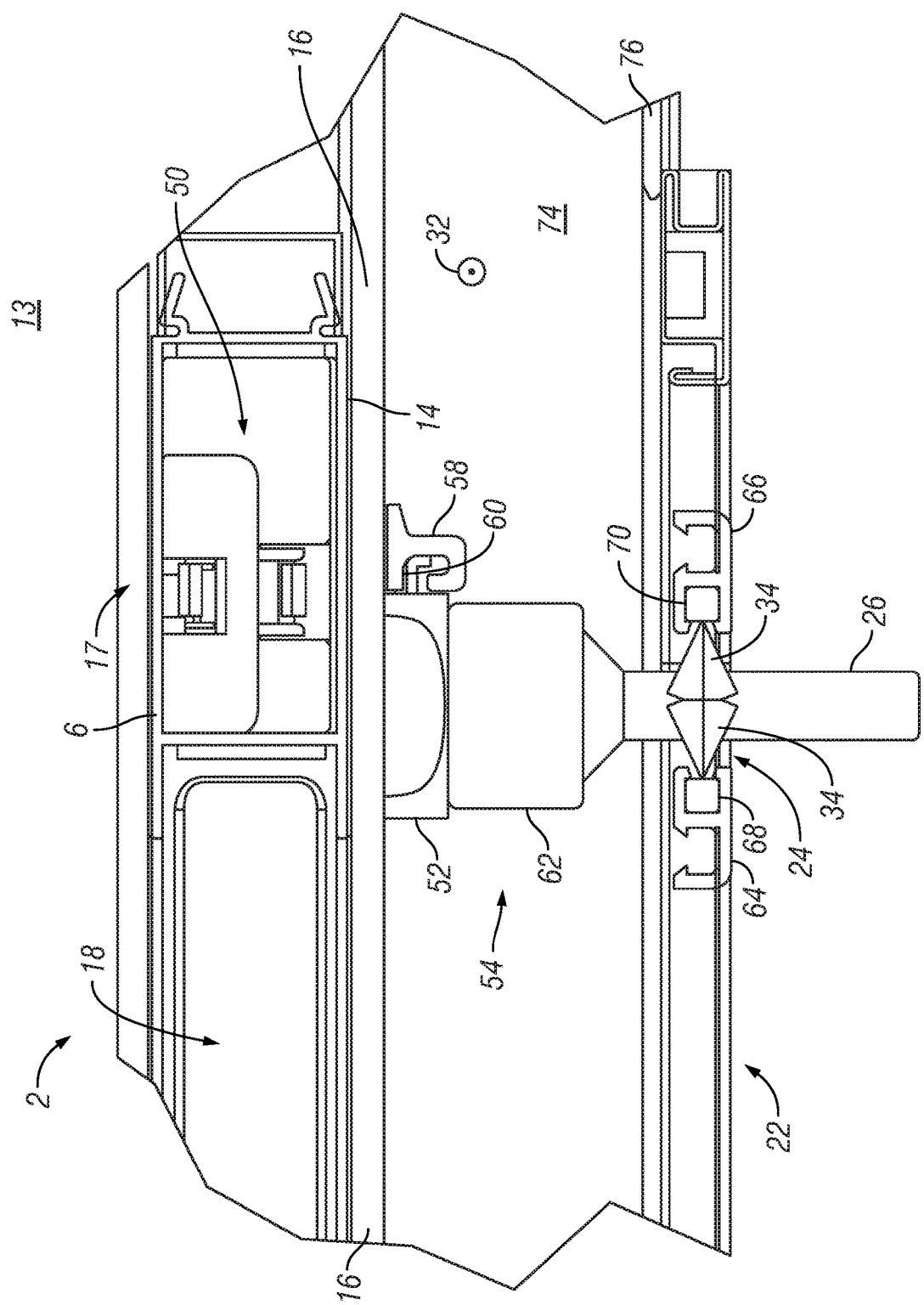
FIG. 6 is a detail view of a portion of the recreational vehicle window assembly taken from FIG. 5.

A detail view taken from a portion of FIG. 5 is shown in FIG. 6. Here, window treatment 18 is shown sandwiched between panes of glass 16 and 17 which are attached to window frame assembly 6. Inside window casing 6, particularly inside style 14 is window treatment adjustment mechanism 50. This adjustment mechanism 50 is mechanically coupled to window treatment 18 to open, close, or otherwise adjust same. Alternatively an inner casing not shown may be employed to support glass window 16.

Illustratively, slider mechanism 54 may include magnets that engage corresponding magnets or other magnetized structures as part of window treatment adjustment mechanism 50 to allow slider 54 to move adjustment mechanism 50 without any actual physical contact. It is appreciated that in other embodiments, mechanisms 50 and 54 may have some physical contact with each other and mechanism 54 may move in a different manner to cause mechanism 54 to adjust window treatment 18. In any event, the embodiment shown employs a window treatment adjustment mechanism 50 that is engagable with a corresponding longitudinal-extending guide 60 attached to base portion 52 to control path of travel of same. In this case, that path of travel is in directions 30 and 32 as shown and demonstrated in FIGS. 1 and 2. Part of slider mechanism 54 is base 62 which is also attached to extension rod 26. It is appreciated here that the precise configuration of extension rod 26 and its attachment to slider mechanism 54, whether through a base portions 52 and 62 or other structures, may vary. The point is that there is a handle or extension structure that extends from the adjustment mechanism of window treatment 18 while extending through screen 22. In this embodiment, extension rod 26 attached to base portion 62 which is attached to base portion 52 can be moved in directions 32 or 30 to move slider mechanism 54 which moves window treatment adjustment mechanism 50 which adjusts window treatment 18. It is further appreciated that extension rod 26 and/or base portions 52 and 62 of slider mechanism 54 may be a monolithic structure. Furthermore, slider mechanism 54 may directly engage either stiles 12 or 14, or may, as shown here, engage a portion of window pane 16.

The cross-sectional view of FIG. 6 also shows slot 24. Longitudinally-extending brackets 64 and 66 line the longitudinal extent of each side of slot 24. Brackets 64 and 66 are further configured to include channels 68 and 70, respectively. Each channel holds a whisker strip 34 that serves a dual purpose of shrouding the opening created by slot 24 as well as not impeding travel of extension rod 26. As extension rod 26 moves in directions 30 or 32, it is able to temporarily displace a portion of whisker strips 34. These whisker strips 34 are resilient to the extent that they will move back to their original shrouding position once extension rod 26 has passed. This view also shows a space 74 created between window pane 16 and screen 22. In addition, a frame casing 76 borders the interior side of recreational vehicle window assembly 2. It is appreciated that the attachment between screen 22 and window frame assembly 6 may be made either through fasteners or magnets.

It is appreciated there may be a variety of different window treatment adjustment mechanisms, screens, bases, or combinations thereof, so the slots and extension structures may vary as well to accommodate these differences. Accordingly, the views of FIGS. 7, 8, 9, and 10 depict different embodiments of a handle/extension rod and base/base portions. It is appreciated that in other embodiments, the extension rod may attach directly to the slider or other adjustment mechanism that moves the window treatment.

Figure 7:
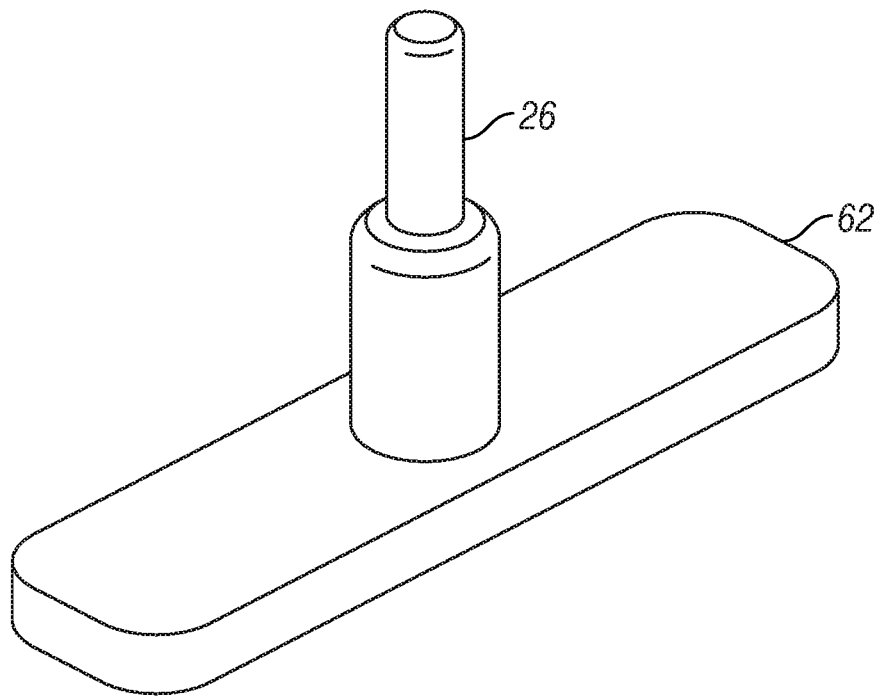
FIG. 7 is a perspective view of an embodiment of a slider base and handle.
Figure 8:
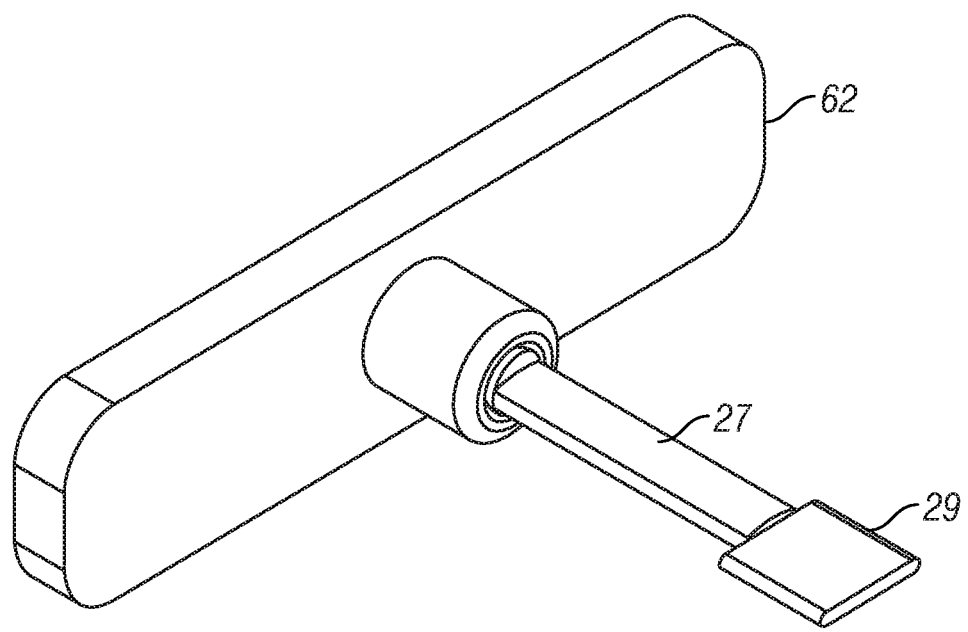
FIG. 8 is a perspective view of another embodiment of a slider base and handle.

The views in FIGS. 7 and 8 show differing embodiments of handle/extension rod 26 and 27. The view shown in FIG. 7 includes extension rod 26 and base portion 62 as shown in the embodiments of FIGS. 1 through 6. Extension rod 26 attached to base portion 62 may then be fastened to slider mechanism 54. It is appreciated that the extension rod 26 may be rotatable to adjust portions of the window treatment. For example, while sliding extension rod 26 up and down may move window treatment 18 likewise up and down, rotating extension rod 26 about its axis may pivot each blind 36 between horizontal and vertical positions.

The view shown in FIG. 8 includes extension rod 27 and base portion 62. Rod 27 is illustratively a flat member with a grip member 29. These structures may provide an enhanced grippable surface in certain circumstances. The embodiment of slider mechanism 55 of FIG. 9 includes handled 26 along with base portions 52 and 62. Handle 26 may also be extended as depicted by portion 31 so that slider mechanism 55 be accessible through slot 24 regardless whether the window assembly 6 is located in the open or closed positions.

Figure 10:
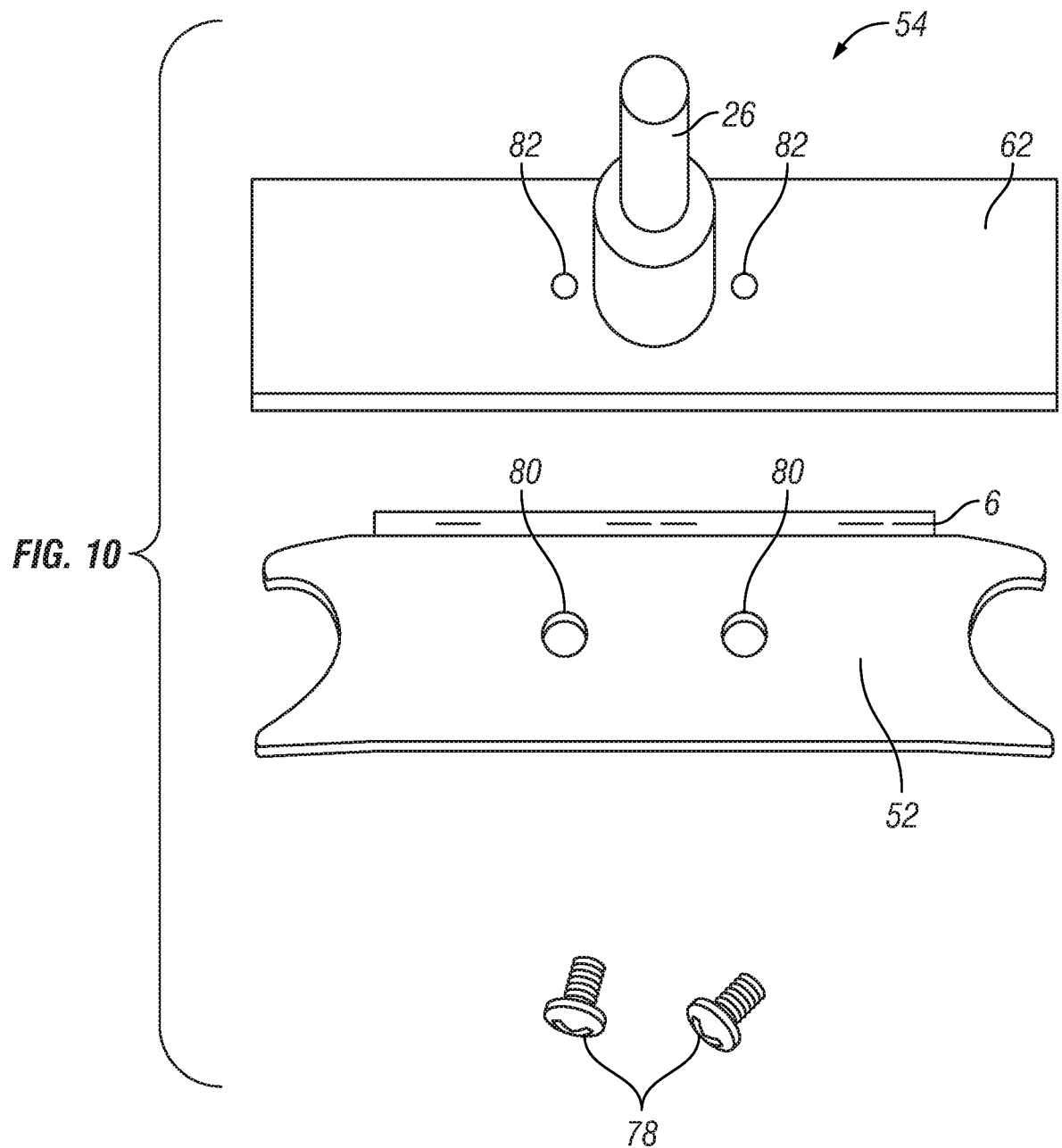
FIG. 10 is an exploded view of the base and rod portions of the handle of FIG. 9.

An exploded view of slider mechanism 54 is shown in FIG. 10. Illustratively, base portion 52 is attached to slider mechanism 54 via fasteners 78 disposed through openings 80 and 82 on base portion 62. It is appreciated that other mechanisms such as ultrasonic welding, adhesives, monolithic molding, etc., may alternatively be used to form the slider base. Also, illustratively, guide 60 extends from base portion 52.

Figure 11:
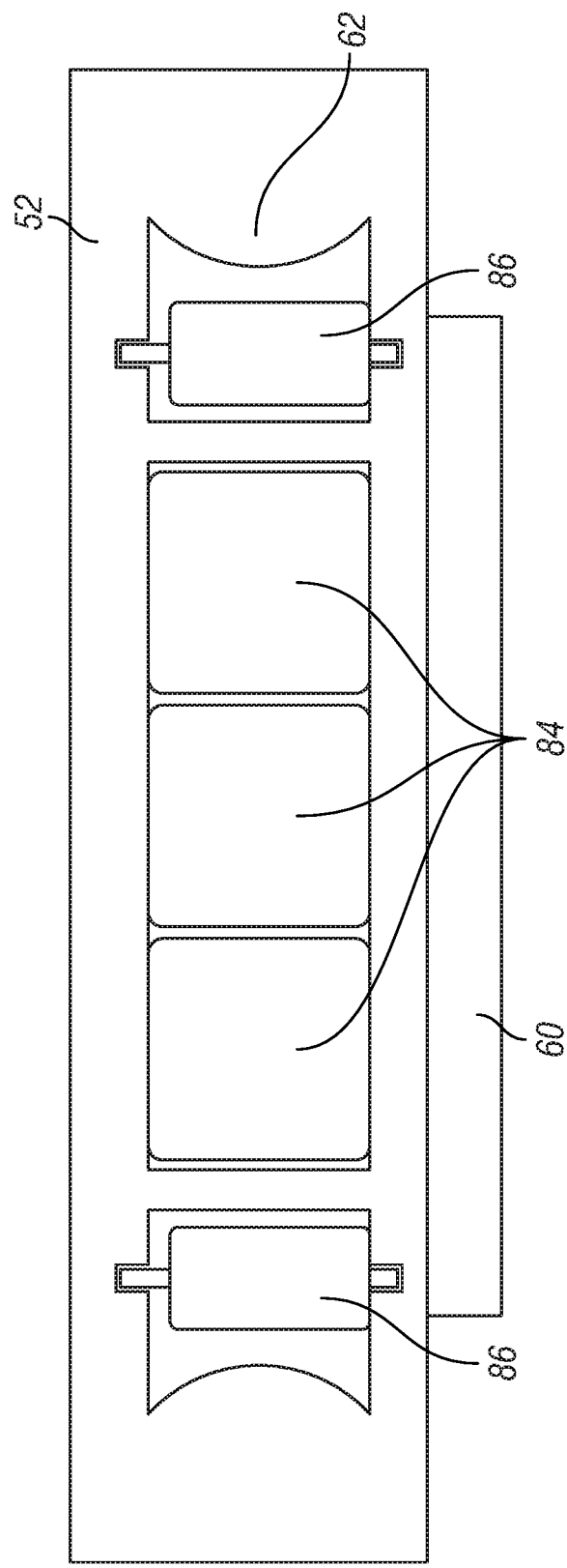
FIG. 11 is an underside view of the handle of FIG. 9.

An underside view of base portion 52 that includes magnets 84 attached thereto to be directed to the window treatment adjustment mechanism 50 located inside window frame assembly 6 is shown in FIG. 11. It is appreciated that magnets 84 magnetically engage window treatment adjustment mechanism 50 to cause window treatment 18 to move when slider mechanism 54 is in proximity of window treatment adjustment mechanism 50. This view also depicts illustrative rollers 86 to assist sliding slider mechanism 54 in directions 30 and 32 along the path of travel 32. Again, guide 60 engages rail 58 as shown in FIG. 6, to limit the direction of travel of slider mechanism 54.

Figure 12:
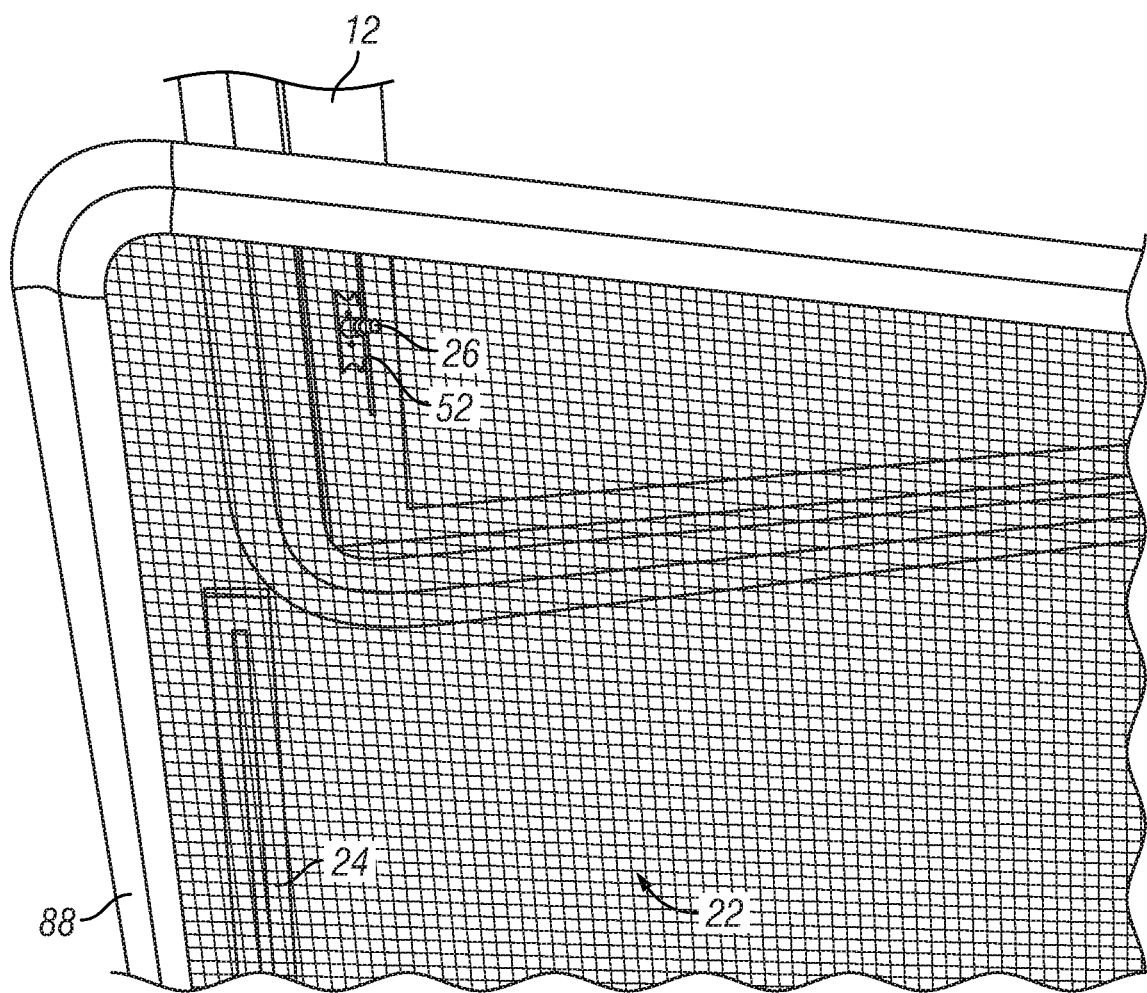
FIG. 12 is a perspective view of a portion of the recreational vehicle window assembly.

A perspective view of recreational vehicle window assembly 2 with screen 18 removed is shown in FIG. 12. This view depicts pocket 24 disposed on the screen 18. Illustratively, screen frame portion 88 may be attached to spring clips (not shown) to hold screen 18 in place. Also shown is sliding mechanism 54 with elongated rod 26 extending therefrom movably along rail 58.

Figure 13:
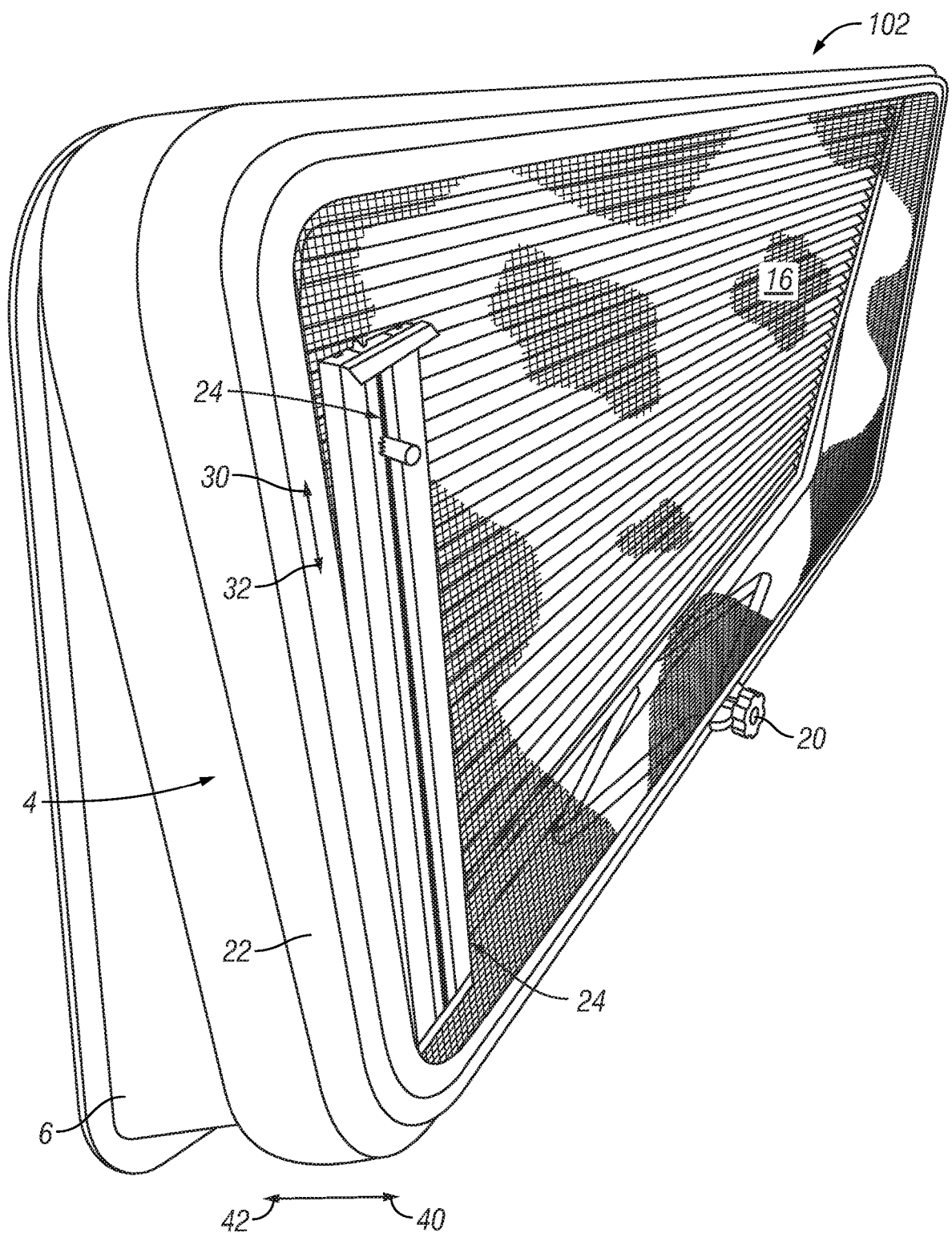
FIG. 13 is a perspective view of another illustrative embodiment of the recreational vehicle window assembly.

A perspective view of another illustrative embodiment of recreational vehicle window assembly 102 is shown in FIG. 13. Like in FIGS. 1 and 2, handle 31 is movable in directions 30 and 32 to adjust the window treatment. In contrast, to the embodiment in those Figures, handle 31 of recreational vehicle window assembly 102 extends through slot 24 even when the window frame assembly 6 is moved in direction 42 to the open position.

While the concepts of the present disclosure are susceptible to various modifications and alternative forms, specific exemplary embodiments thereof have been shown by way of example in the drawings and will herein be described in detail. It should be understood, however, that there is no intent to limit the concepts of the present disclosure to the particular forms disclosed, but on the contrary, the intention is to cover all modifications, equivalents, and alternatives falling within the spirit and scope of the present disclosure.

The invention claimed is:

1. A vehicle of a type having a vehicle window that includes a movable window treatment, a screen that covers at least a portion of the movable window treatment, and a window treatment adjustment, the window treatment adjustment comprising:
   a slider that includes:
      a base movable along a portion of the vehicle window;
      a handle that extends from the base and the vehicle window, through an opening in the screen, and into the vehicle;
   wherein the handle moves the base of the slider.

2. The vehicle having the window treatment adjustment of claim 1, wherein the handle moves the base of the slider adjacent the window treatment.

3. The vehicle having the window treatment adjustment of claim 1, further comprising a shroud attached to the opening, wherein the handle of the slider extends through the opening and past the shroud, and wherein a portion of the shroud is displaced.

4. The vehicle having the window treatment adjustment of claim 1, wherein the base of the slider includes at least one magnet that is in magnetic communication with a portion of the window treatment.

5. The vehicle having the window treatment adjustment of claim 1, further comprising a longitudinally-extending guide rail located on the vehicle window, a coupler on the slider that engages the longitudinally-extending guide rail so the base is movable with respect to the longitudinally-extending guide rail.

6. The vehicle having the window treatment adjustment of claim 3, wherein the shroud is selected from the group consisting of whiskers, woolpile, and at least one rubber strip.

7. The vehicle having the window treatment adjustment of claim 1, wherein a longitudinally extending rod is not extended through the opening in the screen when at least a portion of the vehicle window and at least a portion of the window treatment are located spaced apart from the vehicle.

8. A vehicle of a type having a vehicle window that includes a movable window treatment, a screen that covers at least a portion of the movable window treatment, and a window treatment adjustment, the window treatment adjustment comprising:
   a longitudinally extending rod that extends from the vehicle window, through an opening in the screen, and into the vehicle such that the longitudinally extending rod is operable within the vehicle to move the window treatment;
   wherein the longitudinally extending rod is not extended through the opening in the screen when at least a portion of the vehicle window is spaced apart from the vehicle.

9. The vehicle having the window treatment adjustment of claim 8, further comprising a shroud attached to the opening, wherein the longitudinally-extending rod is extended through the opening and past the shroud, and wherein a portion of the shroud is displaced.

10. The vehicle having the window treatment adjustment of claim 9, wherein the shroud is selected from the group consisting of whiskers, woolpile, and rubber strips.

11. The vehicle having the window treatment adjustment of claim 8, further comprising a base attached to the rod and a coupler on the base engaged to a guide rail on the vehicle window, wherein the longitudinally-extending rod is movable along the guide rail.

12. The vehicle having the window treatment adjustment of claim 11, wherein the guide rail is a longitudinally-extending guide rail.

13. A vehicle of a type having a vehicle window that includes a movable window treatment, a screen that covers at least a portion of the movable window treatment, and a window treatment adjustment, the window treatment adjustment that comprises a longitudinally extending rod that extends from the vehicle window, through an opening in the screen, and inside the vehicle.

14. The vehicle having the window treatment adjustment of claim 13, further comprising a base wherein the longitudinally-extending rod moves the base adjacent the window treatment.

15. The vehicle having the window treatment adjustment of claim 13, further comprising a shroud attached to the opening, wherein the longitudinally-extending rod extends through the opening and past the shroud, and wherein a portion of the shroud is displaced.

16. The vehicle having the window treatment adjustment of claim 14, wherein the base includes at least one magnet that is in magnetic communication with a portion of the window treatment.

17. The vehicle having the window treatment adjustment of claim 13, further comprising a longitudinally-extending guide rail located on the vehicle window, a coupler with the longitudinally-extending rod engaged with the longitudinally-extending guide rail so the longitudinally-extending rod is movable with respect to the longitudinally-extending guide rail.

18. The vehicle having the window treatment adjustment of claim 15, wherein the shroud is selected from the group consisting of whiskers, woolpile, and at least one rubber strip.

19. The vehicle having the window treatment adjustment of claim 13, wherein the longitudinally-extending rod is not extended through the opening of the screen when at least a portion of the vehicle window and at least a portion of the window treatment are located spaced apart from the vehicle.

* * * * *